Sept. 29, 1959         J. L. JENSEN         2,906,896
                    ELECTRICAL APPARATUS
Original Filed Sept. 30, 1957                2 Sheets-Sheet 1

INVENTOR.
JAMES L. JENSEN
BY Omund R Dahle
ATTORNEY

Sept. 29, 1959    J. L. JENSEN    2,906,896
ELECTRICAL APPARATUS
Original Filed Sept. 30, 1957    2 Sheets-Sheet 2

INVENTOR.
JAMES L. JENSEN
BY *Osmund R. Dahl*
ATTORNEY

United States Patent Office 2,906,896
Patented Sept. 29, 1959

2,906,896
ELECTRICAL APPARATUS

James Lee Jensen, St. Louis Park, Minn., assignor to Minneapolis-Honeywell Regulator Company, Minneapolis, Minn., a corporation of Delaware Continuation of application Serial No. 687,196, September 30, 1957. This application September 26, 1958, Serial No. 763,722

20 Claims. (Cl. 307—106)

This invention relates generally to voltage conversion apparatus and more particularly to apparatus for the conversion of polyphase square wave input voltages to polyphase sinusoidal wave type output voltages.

This invention is a continuation of the co-pending application of James Lee Jensen, Serial No. 687,196, filed September 30, 1957.

In many direct current to alternating current converters the alternating current wave form is of the square wave type. This square wave form is useful in some applications but in many applications a sinusoidal type wave form is desirable. For example, a sinusoidal type wave form is desirable for generator control, sine wave amplifiers and other devices obvious to those skilled in the art. In my invention I disclose apparatus whereby square waves are converted to sinusoidal type waves in a low loss-highly efficient manner. The apparatus to be described hereafter is of a low loss and highly efficient type because reactive components are used for the conversion of the square wave input voltages to sinusoidal type output voltages.

An object of this invention is to provide electrical apparatus for the efficient conversion of polyphase square wave input voltages to polyphase sinusoidal type output voltages.

It is a further object of this invention to provide electrical apparatus to convert square wave voltages to sinusoidal type voltages in a low loss-high efficiency manner.

A more specific object of this invention is to provide electrical apparatus to convert three-phase square wave input voltages to three-phase sinusoidal type output voltages utilizing the algebraic summation of the aforementioned three-phase square wave input voltages.

These and other objects of the present invention will be understood upon consideration of the accompanying specification, claims, and drawings of which:

Figure 1:
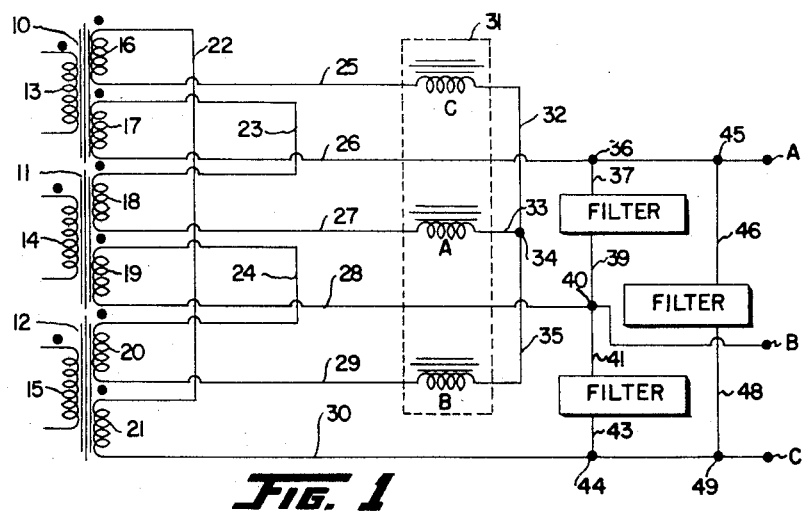
Figure 1 is a schematic diagram of an embodiment of my invention.

Referring now to Figure 1 of the drawings there is disclosed three separate power transformers 10, 11 and 12, said transformers having input primary windings 13, 14 and 15 respectively. In addition, each transformer has two secondary windings wherein the dots appearing above the primary and the secondary windings indicate the transformer lead polarity of the secondary windings of each transformer with respect to the associated transformer primary winding. For example, when the instantaneous potential of the primary winding terminal having a dot appearing thereabove is positive with respect to the remaining primary winding terminal the instantaneous potential of the secondary winding terminal having a dot appearing thereabove is positive with respect to the remaining secondary winding terminal. Transformer 10 has secondary windings 16 and 17, transformer 11 has secondary windings 18 and 19 and transformer 12 has secondary windings 20 and 21. A conductor 22 connects the upper terminal of secondary winding 16 of transformer 10 to the upper terminal of secondary winding 21 of transformer 12. A conductor 23 connects the upper terminal of secondary winding 17 of transformer 10 to the upper terminal of secondary winding 18 of transformer 11. The upper terminal of secondary winding 19 of transformer 11 is connected to the upper terminal of secondary winding 20 of transformer 12 by a conductor 24.

A three winding single core magnetic reactor 31 having three two-terminal windings $a$, $b$ and $c$ is connected in a conventional Y configuration. The center of the Y is a junction 34 having the first terminals of windings $a$, $b$ and $c$ connected thereto by conductor 32, 35 and 32 respectively. The second terminal of winding $c$ is connected to the lower terminal of secondary winding 16 of transformer 10 by a conductor 25. A conductor 27 connects the second terminal of winding $a$ to the lower terminal of secondary winding 18 of transformer 11. The second terminal of winding $b$ is connected to the lower terminal of secondary winding 20 of transformer 12 by a conductor 29. An output terminal A is connected to the lower terminal of secondary winding 17 of transformer 10 by a conductor 26. A conductor 28 connects an output terminal B to the lower terminal of secondary winding 19 of transformer 11. An output terminal C is connected to the lower terminal of secondary winding 21 of transformer 12 by a conductor 30.

A first filter is connected between output terminals A and B by conductors 37 and 39, said conductors terminating at junctions 36 and 40 respectively located on the conductors 26 and 28. A second filter is connected between output terminals B and C by conductors 41 and 43, said conductors terminating at junctions 40 and 44 respectively located on conductors 28 and 30. A third filter is connected between terminals A and C by conductors 46 and 48, said conductors terminating at junctions 45 and 49 located on conductors 26 and 30. The magnetic reactor 31 may be in the form of a three-phase transformer. The filters shown interconnecting the output terminals are preferably reactive and may, for example, in their simplest form be capacitors.

Figure 2:
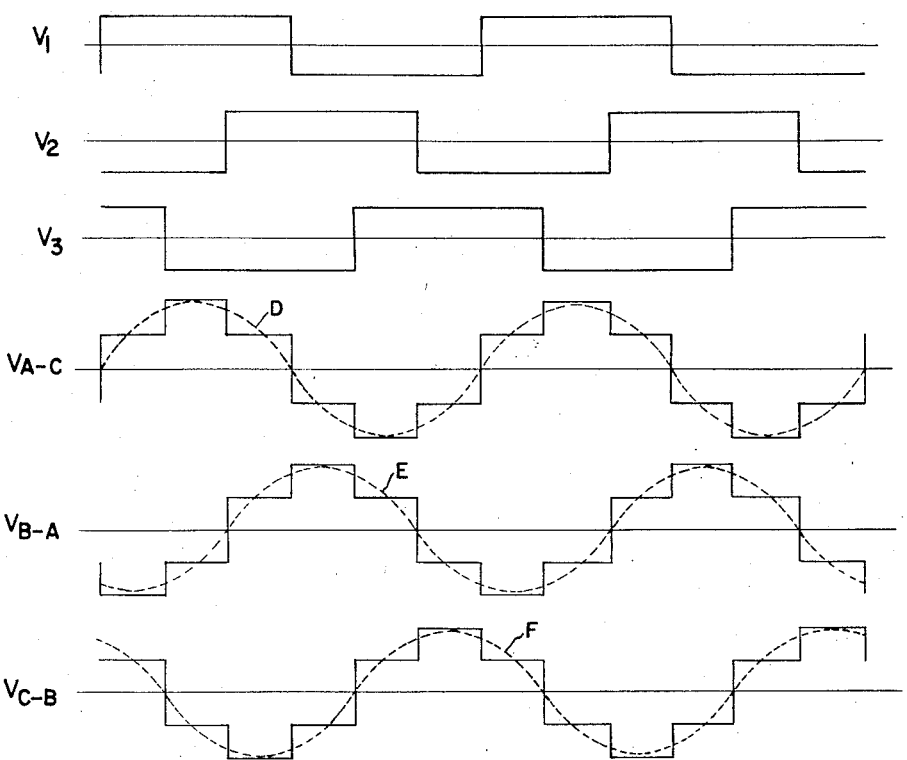
Figure 2 is an illustration of the three-phase square wave input voltage to the apparatus of my invention and the three-phase sinusoidal type output voltage derived therefrom. The ordinate scale of the latter three wave forms shown in Figure 2 is twice the ordinate scale of the first three wave forms.

The operation of Figure 1, to be explained in detail below, may be more readily understood after a consideration of the wave forms shown in Figure 2. Voltages $V_1$, $V_2$ and $V_3$ represent the square wave input voltages to the primary windings of transformers 10, 11 and 12 respectively. It is to be noted that these input voltages are displaced from one another by approximately one third of a cycle. These voltages may be, for example, the output voltages from a three-phase square wave generator in which the phase displacement is inherent or from three separate single-phase square wave generators in which the phase displacement is accomplished by other means. The step voltage wave form $V_{A-C}$ shown in Figure 2 is the voltage wave form which appears between terminals A—C if the filter apparatus of Figure 1 comprising reactor 31 and the filters is not present. Dashed curve D is the wave form representing the sinusoidal type output voltage appearing between terminals A—C when the filter apparatus is inserted in the circuitry of Figure 1. The step voltage wave form $V_{B-A}$ is the voltage wave form which appears between terminals B—A if the aforementioned filter apparatus is not inserted in the circuit of Figure 1. The sinusoidal type output voltage appearing between terminals B—A when the filter apparatus is inserted in the circuit of Figure 1 is represented by dashed curve E. The step voltage wave form $V_{C-B}$ is the voltage wave form which appears between terminals C—B if the aforementioned filter apparatus is not inserted in the circuit of Figure 1. Dashed curve F is the wave form representing the sinusoidal type output voltage appearing between terminals C—B when the filter apparatus is inserted in circuit of Figure 1.

*Operation of Figure 1*

Assume that the input voltages $V_1$, $V_2$ and $V_3$ as shown in Figure 2 are applied to the primary windings of transformers 10, 11 and 12, respectively, and transformed by their respective transformers in such a manner that the voltages which appear across the secondary windings are equal in magnitude to the input voltage. That is to say that a 1:1 turns ratio exists between the primary and each of the secondaries of the transformers 10, 11 and 12. Also assume that the dots on the primary and the secondary windings of the transformers indicate the transformer lead polarity as previously explained.

Neglecting the filter action of the reactor and the filters, a first step voltage wave form appears between output terminals A—C and is formed by a first conductive loop which may be traced from terminal A, through conductor 26, secondary winding 17 of transformer 10, conductor 23, secondary winding 18 of transformer 11, conductor 27, winding $a$ of reactor 31, conductor 33, junction 34, conductor 32, winding $c$ of reactor 31, conductor 25, secondary winding 16 of transformer 10, conductor 22, secondary winding 21 of transformer 12, conductor 30 and terminal C. The step voltage wave form appearing between output terminals A—C is seen to comprise the voltage appearing across the two secondary windings of power transformer 10 and one secondary winding of each of power transformers 11 and 12. The instantaneous voltages induced in each of the power transformer secondary windings are equal in absolute magnitude but due to the phase displacement of the input voltages are not of the same instantaneous polarity. In view of the phase displacement of the input voltages it is apparent that the step voltage appearing between output terminals A—C is equal to the algebraic sum of the instantaneous induced transformer secondary voltages between output terminals A—C. Thus, it can be seen that the resultant potential $V_{A-C}$ is equal to the algebraic sum of $2V_1 - V_2 - V_3$.

A second step voltage appears between output terminals B—A and is formed by a second current conductive loop which may be traced from output terminal B through conductor 28, secondary winding 19 of transformer 11, conductor 24, secondary winding 20 of transformer 12, conductor 29, winding $b$ of reactor 31, conductor 35, junction 34, winding $a$ of reactor 31, conductor 27, secondary winding 18 of transformer 11, conductor 23, secondary winding 17 of transformer 10, conductor 26, and terminal A. The step voltage appearing between output terminals B—A is seen to comprise the voltage appearing across the two secondary windings of power transformer 11 and one secondary winding of each of power transformers 10 and 12. Bearing in mind the phase displacement of the input voltages it can be seen that the step voltage appearing between output terminals B—A is equal to the algebraic sum of the instantaneous induced transformer secondary voltages between output terminals B—A. Thus, it can be seen that $V_{B-A}$ is equal to the algebraic sum of $2V_2 - V_3 - V_1$.

A third step voltage wave form appears between terminals C—B and is formed by a third current conductive loop which may be traced from terminal C through conductor 30, secondary winding 21 of transformer 12, conductor 22, secondary winding 16 of transformer 10, conductor 25, winding $c$ of reactor 31, conductor 32, junction 34, conductor 35, winding $b$ of reactor 31, conductor 29, secondary winding 20 of transformer 12, conductor 24, secondary winding 19 of transformer 11, conductor 28, and terminal B. The step voltage appearing between output terminals C—B is seen to comprise the voltage appearing across the two secondary windings of power transformer 12 and one secondary winding of each of power transformers 10 and 11. Bearing in mind the phase displacement of the input voltages it can be seen that the step voltage appearing between output terminals C—B is equal to the algebraic sum of the instantaneous induced transformer secondary voltages between output terminals C—B. Thus, it can be seen that $V_{C-B}$ is equal to the algebraic sum of $2V_3 - V_1 - V_2$.

The above mentioned current conductive loops reveal that reactor 31 is in the center of a zig-zag Y connection formed by the secondary windings of transformers 10, 11 and 12. The insertion of reactor 31 in combination with the filters inserted between terminals A—B, B—C and A—C attenuates the higher harmonics in the step voltage wave forms and thereby changes the step voltages $V_{A-C}$, $V_{B-C}$ and $V_{C-B}$ substantially to the fundamental sinusoidal types waves D, E and F respectively.

The conversion of the step voltage wave form to the sinusoidal type wave form may be more readily understood upon a discussion of the filter action. As well known in the art, the third harmonic of the sinusoidal type wave form and all multiples of the third harmonic are eliminated by the transformer connection. The removal of the other harmonics by the filters may be more readily understood upon consideration of the following. It can be seen that (1) $\qquad V_{A-C} + V_{B-A} + V_{C-B} = 0$ Instantaneous values (2) $\qquad V_D + V_E + V_F = 0$ It can be shown that (3) $V_{A-C} = \frac{3}{\pi}\left(\sin wt + \frac{1}{5}\sin 5wt + \frac{1}{7}\sin 7wt + \frac{1}{11}\sin 11wt + \frac{1}{13}\sin 13wt + \cdots\right)$ and (4) $\qquad V_D = \frac{3}{\pi}\sin wt$ Now let (5) $\qquad V_{A-C} = \frac{3}{\pi}(V_D + V_{N1})$ (6) $\qquad V_{B-A} = \frac{3}{\pi}(V_E + V_{N2})$ and (7) $\qquad V_{C-B} = \frac{3}{\pi}(V_F + V_{N3})$ where $V_{N1}$, $V_{N2}$ and $V_{N3}$ are the higher harmonics of $V_{A-C}$, $V_{B-A}$ and $V_{C-B}$ respectively. Since (1) $\qquad V_{A-C} + V_{B-A} + V_{C-B} = 0$ (8) $\frac{3}{\pi}[(V_D + V_{N1}) + (V_E + V_{N2}) + (V_F + V_{N3})] = 0$ However, since (2) $\qquad V_D + V_E + V_F = 0$
(9) $\qquad V_{N1} + V_{N2} + V_{N3} = 0$ Thus it can be seen that the sum of the harmonics of the three step voltage wave forms equal zero. The insertion of reactor 31 in combination with the filters inserted between terminals A—B, B—C and A—C compel the addition of the harmonics, tending to remove them from the output voltages. If the harmonics are completely removed, only the fundamental sinusoidal voltages are present at the output terminals. Reactor 31 serves as the mechanism performing the addition, or interchange, of the harmonics between the phases.

Figure 3:
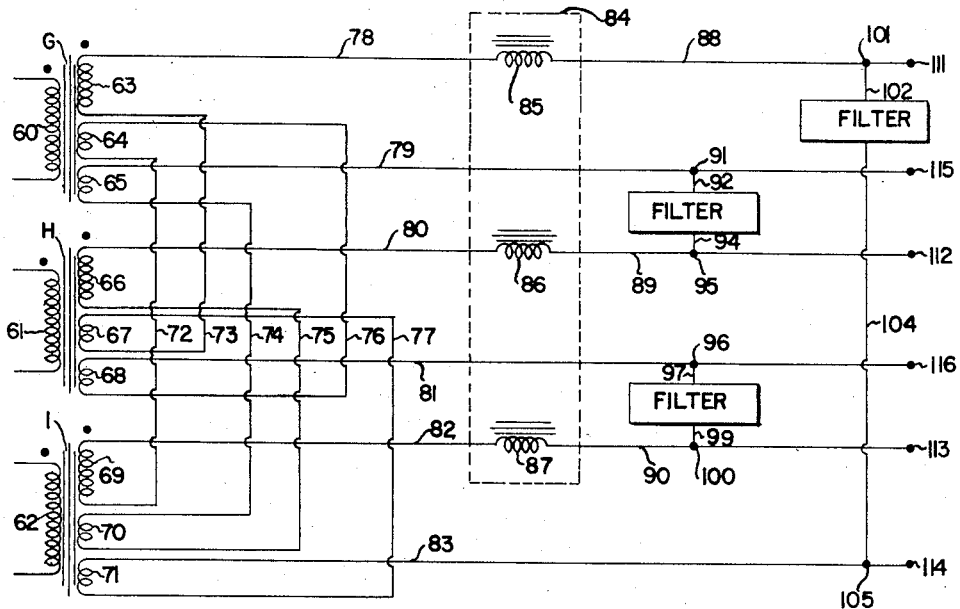
Figures 3 and 4 show a schematic diagram of another embodiment of my invention.

Referring to Figure 3, I show another embodiment of my invention disclosing apparatus for changing polyphase square wave input voltage to polyphase sinusoidal output voltage. The apparatus shown in Figure 3 has the advantage of permitting line-to-neutral as well as line-to-line three-phase sinusoidal output voltage. Shown in Figure 3 are three separate transformers G, H and I. The dots appearing above the primary windings and the secondary windings of transformers G, H and I indicate the transformer lead polarity of said transformers as previously explained in the description of Figure 1. Transformer G has a primary winding 60 and secondary windings 63, 64 and 65. Transformer H has a primary winding 61 and secondary windings 66, 67 and 68. Transformer I has a primary winding 62 and secondary windings 69, 70 and 71. A conductor 72 connects the lower terminal of winding 64 to the lower terminal of winding 69. A conductor 73 connects the lower terminal of winding 63 to the lower terminal of winding 67. The lower terminal of winding 65 is connected to the upper terminal of winding 70 by a conductor 74. The lower terminal of winding 66 is connected to the lower terminal of winding 70 by a conductor 75. A conductor 76 connects the upper terminal of winding 67 to the lower terminal of winding 71.

A magnetic reactor 84 is shown having a winding 85, a winding 86 and a winding 87, each of said windings having two terminals. The first terminal of winding 85 is connected to the upper terminal of winding 63 by a conductor 78. A conductor 79 connects the upper terminal of winding 65 to output terminal 115. A conductor 80 connects the upper terminal of winding 66 to the first terminal of winding 86 of reactor 84. The upper terminal of winding 68 is connected to output terminal 116 by a conductor 81. A conductor 82 connects the upper terminal of winding 69 to the first terminal of winding 87 of reactor 84. A conductor 83 connects the upper terminal of winding 71 to output terminal 114. The second terminal of reactor winding 85 is connected to output terminal 111 by a conductor 68. The second terminal of reactor winding 86 is connected to output terminal 112 by a conductor 89. A conductor 90 connects the second terminal of reactor winding 87 to output terminal 113.

Figure 4:
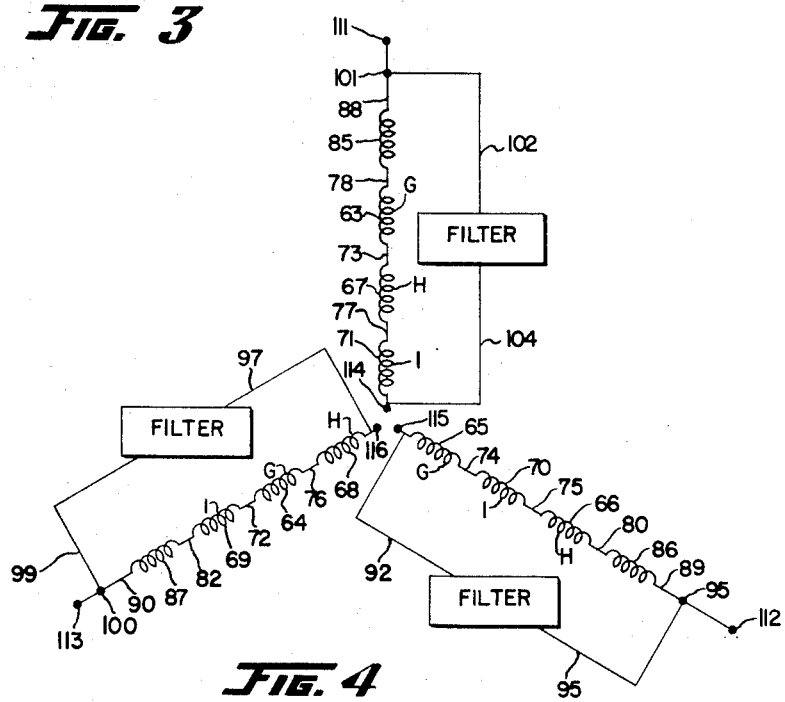

A first filter is connected between output terminals 115 and 112 by conductors 92 and 94, said conductors terminating at junctions 91 and 95 respectively on conductors 79 and 89. A second filter is connected between output terminals 116 and 113 by conductors 97 and 99, said conductors terminating at junctions 96 and 190 respectively on conductors 81 and 90. A third filter is connected between output terminals 111 and 114 by conductors 102 and 104, said conductors terminating at junctions 101 and 105 respectively on conductors 83 and 88. The filters are preferably reactive and may, for example, in their simplest form be capacitors. As stated previously in the description of Figure 1, magnetic reactor 84 may, for example, be a three phase transformer. Operation of the apparatus shown in Figure 3 may be more easily understood upon the consideration of Figure 4 wherein like numbers in Figure 4 indicate like parts of Figure 3.

*Operation of Figure 3*

The operation of Figure 3 may be explained as follows: Assume the input voltages to the primary windings of transformers G, H and I correspond to voltages $V_1$, $V_2$ and $V_3$ shown in Figure 2. Also assume that the voltage ratio between primary windings 60, 61 and 62 and secondary windings 63, 66 and 69 respectively is 1:2. Further assume that the voltage ratio between the primary windings and each of the respective remainder secondary windings is 1:1. For the present neglect the filter action of the filter apparatus comprising magnetic reactors 84 and filters.

A first step voltage wave form appears between output terminals 111 and 114. This step voltage is developed by a first network shown in Figure 4, comprising a series arm and a shunt arm. The series arm may be traced from output terminal 111 through junction 101, conductor 88, winding 85 of reactor 84, conductor 78, winding 63 of transformer G, conductor 73, winding 67 of transformer H, conductor 77, winding 71 of transformer I, conductor 83, junction 105 and output terminal 114. A filter is connected in parallel with the first series arm by conductors 102 and 104. The step voltage wave form appearing between output terminals 111—114 is seen to comprise the voltages appearing across secondary windings 63, 67 and 71 of transformers G, H and I respectively. It is to be noted that the absolute magnitude of the instantaneous voltage induced in winding 63 is equal to twice the absolute magnitude of the instantaneous voltage induced in windings 67 and 71. Due to the phase displacement of the input voltages the polarity of the induced secondary voltages are unlike, therefore the total voltage appearing across any network is the algebraic sum of the instantaneous induced transformer secondary voltages included in that network. Therefore, neglecting the filter action of reactor and the filters it can be seen that the step voltage appearing between terminals 111 and 114 is equal to the algebraic sum of $2V_1-V_2-V_3$.

A second step voltage wave form appears between output terminals 112 and 115. This second step voltage wave form is developed by a second network, shown in Figure 4, comprising a series arm and a shunt arm. The series arm may be traced from terminal 112 through conductor 89, winding 86 of reactor 84, conductor 80, winding 66 of transformer H, conductor 75, winding 70 of transformer I, conductor 74, winding 65 of transformer G, conductor 79 and output terminal 115. In parallel with this series arm is a shunt arm including a filter, said filter being connected between junctions 91 and 95 by conductors 92 and 94. The step voltage wave form appearing between output terminals 112 and 115 is seen to comprise the voltages appearing across secondary windings 66, 70 and 65 of power transformers H, I and G respectively. The absolute magnitude of the instantaneous voltage induced in winding 66 is equal to twice the absolute magnitude of the instantaneous voltage induced in winding 70 or 65. Keeping in mind the input voltage phase displacement and neglecting the filter action of the reactor and the filter it can be seen that the step voltage wave form appearing between output terminals 112 and 115 is equal to the algebraic sum of $2V_2-V_3-V_1$.

A third step voltage wave form appears between output terminals 113 and 116. This third step voltage wave form is developed by a third network shown in Figure 4, comprising a series arm and a shunt arm. The series arm may be traced from output terminal 113 through conductor 90, winding 87 of reactor 84, conductor 82, winding 69 of transformer I, conductor 72, winding 64 of transformer G, conductor 76, winding 68 of transformer H, conductor 81 and output terminal 116. In parallel with this series arm is a shunt arm including a filter and conductors 97 and 99, said conductor being connected to junction 96 and 100 respectively. The step voltage wave form appearing between output terminals 113 and 116 is seen to comprise the voltages appearing across secondary windings 69, 64 and 68 of power transformers I, G and H respectively. The absolute magnitude of the instantaneous voltage induced in winding 69 is equal to twice the absolute magnitude of the instantaneous voltage induced in winding 64 and 68. Keeping in mind the input voltage phase displacement and neglecting the filter action of the reactor and filter, it can be seen that the step voltage wave form appearing between output terminals 113 and 116 is equal to the algebraic sum of $2V_3-V_1-V_2$.

The step voltage wave forms described above are similar to the step voltage wave forms shown in Figure 2 and the insertion of the magnetic reactor and the filters will convert the step voltage wave forms to sinusoidal type wave forms. The conversion of the step voltage wave forms to sinusoidal type wave forms has previously been explained in Equations 1 through 9.

The apparatus shown in Figure 3 has the advantage of being able to produce three-phase line-to-neutral as well as three-phase line-to-line sinusoidal voltage. The method of obtaining these voltages is obvious upon referral to Figure 4, for example, 4 wire or 3 wire three-phase sinusoidal type output voltage is obtained when terminals 114, 115 and 116 are directly connected together. Also, three-phase line-to-line voltage is obtainable when a delta configuration is utilized. A usable delta configuration is obtained when terminal 111 is connected to terminal 115, terminal 112 is connected to terminal 116 and terminal 113 is connected to terminal 114.

It is to be understood that there are many modifications of the embodiments shown in my invention and I therefore wish it to be understood that I intend to be limited only by the scope of the appended claims.

What I claim as my invention is:

1. Low loss-high efficiency voltage conversion apparatus comprising; a plurality of inductive means, each of said inductive means having an input circuit and an output circuit, said output circuit having at least two sections; filter means including magnetic core reactor means and impedance loading means, said loading means connected interjacent a plurality of output terminals; means connecting said reactor means in circuit with one of said sections of each of said inductive means and one of said output terminals; a source of polyphase non-sinusoidal signal; means coupling one phase of said signal to the input circuit of each of said inductive means whereby said polyphase non-sinusoidal input is converted to polyphase sinusoidal type output signal.

2. Low loss-high efficiency voltage conversion apparatus comprising; three transformer means, each of said transformer means having an input circuit and an output circuit, said output circuit having at least two windings; filter means including three-phase transformer means and impedance loading means, said impedance loading means connected interjacent a plurality of output terminals; means connecting at least one winding of said three-phase transformer means in series with one winding of each of said transformer means and one of said output terminals; a source of three-phase square wave input signal; means connecting one phase of said source to the input circuit of one of said transformer means whereby said three-phase square wave input voltage is converted to three-phase sinusoidal type output voltage.

3. Low loss-high efficiency voltage conversion apparatus comprising; first, second and third transformer means, each of said transformer means having a primary winding and first and second secondary windings; filter means including three winding single core magnetic reactor means connected in three-phase configuration and impedance loading means, said loading means connected interjacent each of three output terminals; means including the first secondary winding of said second transformer means connecting the second secondary winding of said first transformer means interjacent the first winding of said reactor means and the first of said output terminals; means including the first secondary winding of said third transformer means connecting the second secondary winding of said second transformer means interjacent the secondary winding of said reactor means and the second of said output terminals; means including the first secondary winding of said first transformer means connecting the second secondary winding of said third transformer means interjacent the third winding of said reactor and the third of said output terminals; three sources of single phase square wave input voltage each of said sources substantially displaced one third cycle from one another; means connecting one of said sources respectively to the primary winding of one of said transformer means whereby said three single phase square wave input voltages are converted to three phase sinusoidal type output voltage.

4. Low loss-high efficiency voltage conversion apparatus comprising; first, second and third transformer means, each of said transformer means having a primary winding and first and second secondary windings; filter means including three winding single core magnetic reactor means connected in three-phase configuration and capacitive loading means, said loading means connected interjacent each of three output terminals; means including the first secondary winding of said second transformer means connecting the second secondary winding of said first transformer means interjacent the first winding of said reactor means and the first of said output terminals; means including the first secondary winding of said third transformer means connecting the second secondary winding of said second transformer means interjacent the second winding of said reactor means and the second of said output terminals; means including the first secondary winding of said first transformer means connecting the second secondary winding of said third transformer means interjacent the third winding of said reactor and the third of said output terminals; three sources of single phase square wave input voltage each of said sources substantially displaced one third cycle from one another; means connecting one of said sources respectively to the primary winding of one of said transformer means whereby said three single phase square wave input voltages are converted to three phase sinusoidal type output voltage.

5. Low loss-high efficiency voltage conversion apparatus comprising; first, second and third transformer means, each of said transformer means having a primary winding and first and second secondary windings; filter means including three winding single core magnetic reactor means connected in three-phase configuration and impedance loading means, said loading means connected interjacent each of three output terminals; means including the first secondary winding of said second transformer means connecting the second secondary winding of said first transformer means interjacent the first winding of said reactor means and the first of said output terminals; means including the first secondary winding of said third transformer means connecting the second secondary winding of said second transformer means interjacent the second winding of said reactor means and the second of said output terminals; means including the first secondary winding of said first transformer means connecting the second secondary winding of said third transformer means interjacent the third winding of said reactor and the third of said output terminals; a source of three phase square wave input voltage; means connecting one phase of said source to the primary winding of one of said transformer means whereby said three phase square wave input voltage is converted to three phase sinusoidal type output voltage.

6. Low loss-high efficiency voltage conversion apparatus comprising; first, second and third transformer means, each of said transformer means having a primary winding and first and second secondary windings; filter means including three winding single core magnetic reactor means connected in three-phase configuration and capacitive loading means, said loading means connected interjacent each of three output terminals; means including the first secondary winding of said second transformer means connecting the second secondary winding of said first transformer means interjacent the first winding of said reactor means and the first of said output terminals; means including the first secondary winding of said third transformer means connecting the second secondary winding of said second transformer means interjacent the second winding of said reactor means and the second of said output terminals; means including the first secondary winding of said first transformer means connecting the second secondary winding of said third transformer means interjacent the third winding of said reactor and the third of said output terminals; a source of three phase square wave input voltage; means connecting one phase of said source to the primary winding of one of said transformer means whereby said three phase square wave input voltage is converted to three phase sinusoidal type output voltage.

7. Low loss-high efficiency voltage conversion apparatus comprising; first, second and third transformer means, each of said transformer means having a primary winding and first and second secondary windings; filter means including three phase transformer means having first, second and third windings connected in three-phase configuration and impedance loading means, said loading means interconnecting each of three output terminals; means including the first secondary winding of said second transformer means connecting the second secondary winding of said first transformer means interjacent a first winding of said three phase transformer and the first of said output terminals; means including the first secondary winding of said third transformer means connecting the second secondary winding of said second transformer means interjacent a second winding of said three phase transformer and the second of said output terminals; means including the first secondary winding of said first transformer means connecting the second secondary winding of said third transformer means interjacent a third winding of said three phase transformer and the third of said output terminals; three sources of single phase square wave input voltage, each of said sources substantially displaced one third cycle from one another; means connecting one of said sources, respectively, to the primary winding of one of said transformer means whereby said three single-phase square wave input voltages are converted to three phase sinusoidal type output voltage.

8. Low loss-high efficiency voltage conversion apparatus comprising; first, second and third transformer means, each of said transformer means having a primary winding and first and second secondary windings; filter means including three phase transformer means having first, second and third windings connected in three-phase configuration and capacitive loading means, said loading means interconnecting each of three output terminals; means including the first secondary winding of said second transformer means connecting the second secondary winding of said first transformer means interjacent a first winding of said three phase transformer and the first of said output terminals; means including the first secondary winding of said third transformer means connecting the second secondary winding of said second transformer means interjacent a second winding of said three phase transformer and the second of said output terminals; means including the first secondary winding of said first transformer means connecting the second secondary winding of said third transformer means interjacent a third winding of said three phase transformer and the third of said output terminals; three sources of single phase square wave input voltage, each of said sources substantially displaced one third cycle from one another; means connecting one of said sources, respectively, to the primary winding of one of said transformer means whereby said three single-phase square wave input voltages are converted to three phase sinusoidal type output voltage.

9. Low loss-high efficiency voltage conversion apparatus comprising; first, second and third transformer means, each of said transformer means having a primary winding and first and second secondary windings; filter means including three phase transformer means having first, second and third windings connected in three-phase configuration and impedance loading means, said loading means interconnecting each of three output terminals; means including the first secondary winding of said second transformer means connecting the second secondary winding of said first transformer means interjacent a first winding of said three phase transformer and the first of said output terminals; means including the first secondary winding of said third transformer means connecting the second secondary winding of said second transformer means interjacent a second winding of said three phase transformer and the second of said output terminals; means including the first secondary winding of said first transformer means connecting the second secondary winding of said third transformer means interjacent a third winding of said three phase transformer and the third of said output terminals; a source of three phase square wave input voltage; means coupling a phase of said source to the primary winding one of said transformer means whereby said three phase square wave input voltage is converted to three phase sinusoidal type output voltage.

10. Low loss-high efficiency voltage conversion apparatus comprising; first, second and third transformer means, each of said transformer means having a primary winding and first and second secondary windings; filter means including three phase transformer means having first, second and third windings connected in three-phase configuration and capacitive loading means, said loading means interconnecting each of three output terminals; means including the first secondary winding of said second transformer means connecting the second secondary winding of said first transformer means interjacent a first winding of said three phase transformer and the first of said output terminals; means including the first secondary winding of said third transformer means connecting the second secondary winding of said second transformer means interjacent a second winding of said three phase transformer and the second of said output terminals; means including the first secondary winding of said first transformer means connecting the second secondary winding of said third transformer means interjacent a third winding of said three phase transformer and the third of said output terminals; a source of three phase square wave input voltage; means coupling a phase of said source to the primary winding one of said transformer means whereby said three phase square wave input voltage is converted to three phase sinusoidal type output voltage.

11. Low loss-high efficiency voltage conversion apparatus comprising; first, second and third transformer means, each of said transformer means having a primary winding and first, second and third secondary windings; filter means including three winding single core magnetic reactor means and capacitive loading means; a first network connected interjacent two output terminals having a series arm including the first winding of said reactor means, the first winding of said first transformer means, the second winding of said second transformer means and the third winding of said third transformer means and a shunt arm including a portion of said capacitive loading means; a second network connected interjacent two output terminals having a series arm including the second winding of said reactor, the first winding of said second transformer means, the second winding of said third transformer means and the third winding of said first transformer means and a shunt arm including a portion of said capacitive loading means; a third network connected interjacent two output terminals having a series arm including the third winding of said reactor means, the second winding of said first transformer means and the third winding of said second transformer means and a shunt arm including a portion of said capacitive loading means, means connecting said first, second and third networks in three phase configuration; a source of three phase square wave input voltage; means connecting a phase of said source of each of said transformer means whereby said three phase square wave input voltage is converted to three phase sinusoidal type output voltage.

12. Low loss-high efficiency voltage conversion apparatus comprising; first, second and third transformer means, each of said transformer means having a primary winding and first, second and third secondary windings; filter means including three winding single core magnetic reactor means and impedance loading means; a first network connected interjacent two output terminals having a series arm including the first winding of said reactor means, the first winding of said first transformer means, the second winding of said second transformer means and the third winding of said third transformer means and a shunt arm including a portion of said impedance loading means; a second network connected interjacent two output terminals having a series arm including the second winding of said reactor, the first winding of said second transformer means the second winding of said third transformer means and the third winding of said first transformer means and a shunt arm including a portion of said impedance loading means; a third network connected interjacent two output terminals having a series arm including a third winding of said reactor means, the second winding of said first transformer means and the third winding of said second transformer means and a shunt arm including a portion of said impedance loading means, means connecting said first, second and third networks in three phase configuration, a source of three phase square wave input voltage; means connecting a phase of said source to each of said transformer means whereby said three phase square wave input voltage is converted to three phase sinusoidal type output voltage.

13. Low loss-high efficiency voltage conversion apparatus comprising; first, second and third transformer means, each of said transformer means having a primary winding said first, second and third secondary windings; filter means including three winding single core magnetic reactor means and capacitive loading means; a first network connected interjacent two output terminals having a series arm including the first winding of said reactor means, the first winding of said first transformer means, the second winding of said second transformer means and the third winding of said third transformer means and a shunt arm including a portion of said capacitive loading means; a second network connected interjacent two output terminals having a series arm including the second winding of said reactor, the first winding of said second transformer means the second winding of said third transformer means and the third winding of said first transformer means and a shunt arm including a portion of said capacitive loading means; a third network connected interjacent two output terminals having a series arm including a third winding of said reactor means, the second winding of said first transformer means and the third winding of said second transformer means and a shunt arm including a portion of said capacitive loading means, means connecting said first, second and third networks in three phase configuration; three sources of single phase square wave input voltage, each of said sources substantially displaced one third cycle from one another; means connecting one of said sources, respectively, to the primary winding of one of said transformer means whereby said three single phase square wave input voltages are converted to three phase sinusoidal type output voltage.

14. Low loss-high efficiency voltage conversion apparatus comprising; first, second and third transformer means, each of said transformer means having a primary winding and first, second and third secondary windings; filter means including three winding single core magnetic reactor means and impedance loading means; a first network connected interjacent two output terminals having a series arm including the first winding of said reactor means, the first winding of said first transformer means, the second winding of said second transformer means and the third winding of said third transformer means and a shunt arm including a portion of said impedance loading means; a second network connected interjacent two output terminals having a series arm including the second winding of said reactor, the first winding of said second transformer means, the second winding of said third transformer means and the third winding of said first transformer means and a shunt arm including a portion of said impedance loading means; a third network connected interjacent two output terminals having a series arm including a third winding of said reactor means, the second winding of said first transformer means and the third winding of said second transformer means and a shunt arm including a portion of said impedance loading means, means connecting said first, second and third networks in three phase configuration; three sources of single phase square wave input voltage, each of said sources substantially displaced one third cycle from one another; means connecting one of said sources, respectively, to the primary winding of one of said transformer means whereby said three single phase square wave input voltages are converted to three phase sinusoidal type output voltage.

15. Low loss-high efficiency voltage conversion apparatus comprising; first, second and third transformer means, each of said transformer means having a primary winding and first, second and third secondary windings; filter means including three winding three phase transformer means and impedance loading means; a first network connected interjacent two output terminals having a series arm including the first winding of said three phase transformer means, the first winding of said first transformer means, the second winding of said second transformer means and the third winding of said third transformer means and a shunt arm including a portion of said impedance loading means; a second network connected interjacent two output terminals having a series arm including the second winding of said three phase transformer, the first winding of said second transformer means, the second winding of said third transformer means and the third winding of said first transformer means and a shunt arm including a portion of said impedance loading means; a third network connected interjacent two output terminals having a series arm including the third winding of said three phase transformer means, the second winding of said first transformer means and the third winding of said second transformer means and a shunt arm including a portion of said impedance loading means; means connecting said first, second and third networks in three phase configuration; three sources of single phase square wave input voltage, each of said sources substantially displaced one third cycle from one another; means connecting one of said sources, respectively, to the primary winding of one of said transformer means whereby said three single phase square wave input voltages are converted to three phase sinusoidal type output voltage.

16. Low loss-high efficiency voltage conversion apparatus comprising; first, second and third transformer means, each of said transformer means having a primary winding and first, second and third secondary windings; filter means including three winding three phase transformer means and capacitive loading means; a first network connected interjacent two output terminals having a series arm including the first winding of said three phase transformer means, the first winding of said first transformer means, the second winding of said second transformer means and the third winding of said third transformer means and a shunt arm including a portion of said capacitive loading means; a second network connected interjacent two output terminals having a series arm including the second winding of said three phase transformer, the first winding of said second transformer means, the second winding of said third transformer means and the third winding of said first transformer means and a shunt arm including a portion of said capacitive loading means; a third network connected interjacent two output terminals having a series arm including the third winding of said three phase transformer means, the second winding of said first transformer means and the third winding of said second transformer means and a shunt arm including a portion of said capacitive loading means, means connecting said first, second and third networks in three phase configuration; three sources of single phase square wave input voltage, each of said sources substantially displaced one third cycle from one another; means connecting one of said sources, respectively, to the primary winding of one of said transformer means whereby said three single phase square wave input voltages are converted to three phase sinusoidal type output voltage.

17. Low loss-high efficiency voltage waveshape conversion apparatus comprising: a source of polyphase non-sinusoidal power of uniform wave form but having fundamental and higher harmonic content; polyphase coupling means energized from said polyphase source for selectively adding and subtracting together various voltages derived from said phases so as to result in a composite polyphase voltage output simulating sinusoidal form; and filter means connected to said coupling means for substantially eliminating the higher harmonic content of said polyphase source.

18. Low loss-high efficiency voltage waveshape conversion apparatus comprising: a source of polyphase substantially square wave power of uniform wave form but having fundamental and higher harmonic content; polyphase summing means energized from said polyphase source for selectively algebraically summing and subtracting together various voltages derived from said phases so as to result in a composite polyphase voltage output simulating sinusoidal form; and filter means connected to said summing means for substantially eliminating the higher harmonic content of said polyphase source.

19. Low loss-high efficiency voltage waveshape conversion apparatus comprising: a source of non-sinusoidal polyphase power of uniform waveform but having fundamental and higher harmonic components; a plurality of inductive type means, each of said inductive type means having an input circuit and output circuit means; means coupling a separate phase of said power source to the input circuit of each of said inductive type means; and polyphase summing means including filter means interconnecting the output circuit means of said plurality of inductive type means so that the output potentials are selectively added and opposed to produce a polyphase composite output potential, each phase having an overall waveshape resembling a sinusoidal envelope, said filter means being effective to substantially eliminate the higher harmonic components from the simulated sinusoidal output potential.

20. Low loss-high efficiency voltage waveshape conversion apparatus comprising: a source of substantially square wave polyphase power of uniform waveform but having fundamental and higher harmonic components; a plurality of inductive type means, each of said inductive type means having an input circuit and output circuit means; means coupling a separate phase of said power source to the input circuit of each of said inductive type means; and polyphase summing means including filter means interconnecting the output circuit means of said plurality of inductive type means so that the output potentials are selectively added and opposed to produce a polyphase composite output potential, each phase having an overall waveshape simulating a sinusoidal envelope, said filter means being effective to substantially eliminate the higher harmonic components from the simulated sinusoidal output potential.

No references cited.